US012667939B2

(12) United States Patent
Zimmer et al.

(10) Patent No.: US 12,667,939 B2
(45) Date of Patent: Jun. 30, 2026

(54) WORKPIECE-CLAMPING ELEMENT

(71) Applicants: Martin Zimmer, Rheinau (DE);
Günther Zimmer, Rheinau (DE)

(72) Inventors: Martin Zimmer, Rheinau (DE);
Günther Zimmer, Rheinau (DE)

( * ) Notice: Subject to any disclaimer, the term of this patent is extended or adjusted under 35 U.S.C. 154(b) by 415 days.

(21) Appl. No.: 18/289,401

(22) PCT Filed: May 5, 2022

(86) PCT No.: PCT/DE2022/000049
§ 371 (c)(1),
(2) Date: Feb. 5, 2024

(87) PCT Pub. No.: WO2022/233353
PCT Pub. Date: Nov. 10, 2022

(65) Prior Publication Data
US 2024/0238944 A1      Jul. 18, 2024

(30) Foreign Application Priority Data

May 5, 2021    (DE) ..................... 10 2021 002 385.4

(51) Int. Cl.
*B25B 11/00*          (2006.01)
*B23Q 1/03*           (2006.01)
*B23Q 3/08*           (2006.01)
(52) U.S. Cl.
CPC ............ *B25B 11/005* (2013.01); *B23Q 1/035* (2013.01); *B23Q 3/088* (2013.01)
(58) Field of Classification Search
CPC ........ B25B 11/005; B23Q 1/035; B23Q 1/088
See application file for complete search history.

(56) References Cited

U.S. PATENT DOCUMENTS 3,804,397 A * 4/1974 Neumann ............. B25B 11/007
                                                 269/21
5,120,033 A    6/1992 Shoda
5,143,360 A * 9/1992 Wilken ................... B25B 11/00
                                                 269/21
(Continued)

FOREIGN PATENT DOCUMENTS

CN        106232999 A      12/2016
CN        106826626 A       6/2017
(Continued)

OTHER PUBLICATIONS

U.S. Appl. No. 18/289,394, filed Nov. 3, 2023, Martin Zimmer.

*Primary Examiner* — Seahee Hong
(74) *Attorney, Agent, or Firm* — Smartpat PLC

(57)          ABSTRACT

A workpiece-clamping element has a cylinder and a lifting rod assembly guided in the cylinder with an annular piston and with an inner tube. The lifting rod assembly carries a suction plate having a workpiece support surface. A workpiece table has a plurality of workpiece-clamping elements of this type. A cylinder bottom of the cylinder penetrated by the lifting rod assembly, the lifting rod assembly and a cylinder jacket tube of the cylinder delimit a pressure chamber. In addition, the lifting rod assembly is mounted both in the cylinder bottom and in the cylinder head so that it can be displaced at least axially. The present disclosure allows a short changeover time and a shortened throughput time of workpieces.

10 Claims, 10 Drawing Sheets

(56) References Cited

U.S. PATENT DOCUMENTS

| | | | | |
|---|---|---|---|---|
| 5,346,193 A * | 9/1994 | Kitagawa | B25B 11/005 | |
| | | | | 269/21 |
| 5,364,083 A * | 11/1994 | Ross | B25B 11/005 | |
| | | | | 269/21 |
| 5,457,868 A * | 10/1995 | Blaimschein | B25B 11/007 | |
| | | | | 269/21 |
| 6,032,348 A * | 3/2000 | Haas | B23Q 1/035 | |
| | | | | 29/469 |
| 8,079,578 B2 * | 12/2011 | Bumgarner | B23Q 1/035 | |
| | | | | 269/21 |
| 8,136,802 B2 * | 3/2012 | Cho | B65G 47/91 | |
| | | | | 269/21 |
| 8,469,345 B2 * | 6/2013 | Samac | B23Q 3/06 | |
| | | | | 269/21 |
| 9,776,329 B2 * | 10/2017 | Kai | B25J 9/104 | |
| 2012/0233994 A1 | 9/2012 | Maffeis | | |
| 2017/0219504 A1 | 8/2017 | Volz et al. | | |
| 2021/0107106 A1 | 4/2021 | Haruna et al. | | |

FOREIGN PATENT DOCUMENTS

| | | | |
|---|---|---|---|
| DE | 3810711 | A1 | 12/1988 |
| DE | 4215140 | A1 | 11/1993 |
| DE | 10350572 | A1 | 6/2005 |
| EP | 1484142 | A1 | 12/2004 |
| EP | 3766645 | A1 | 1/2021 |
| JP | H11123685 | A | 5/1999 |
| WO | 0178947 | A1 | 10/2001 |

* cited by examiner

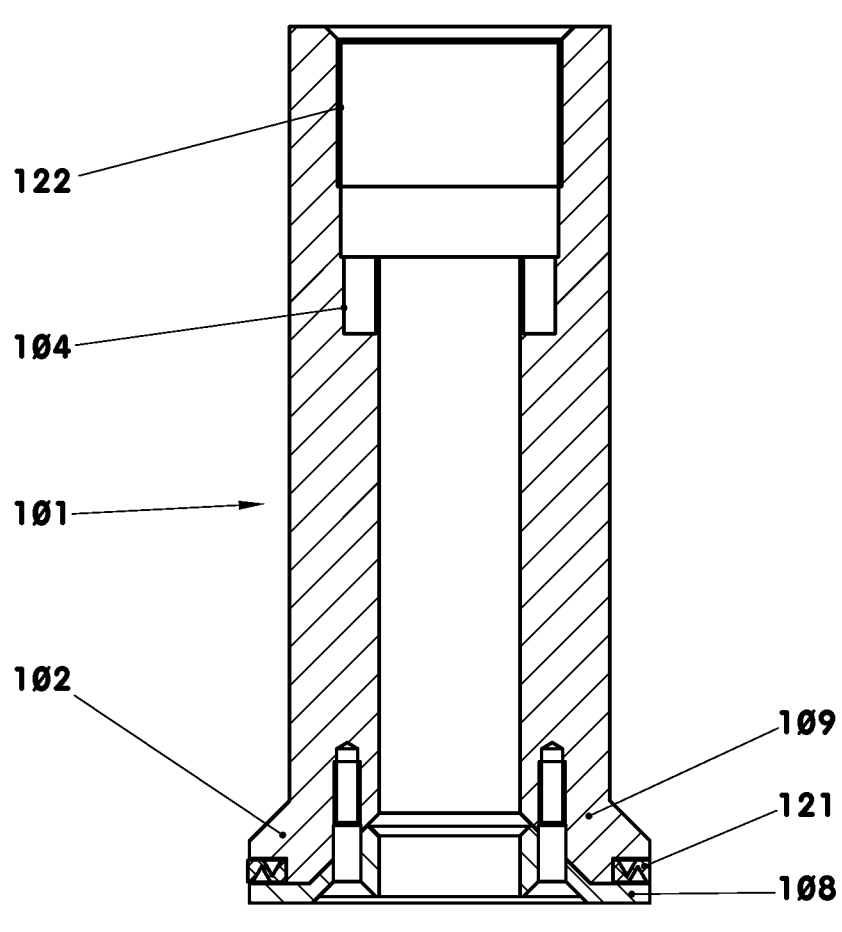
Fig. 3
Fig. 5
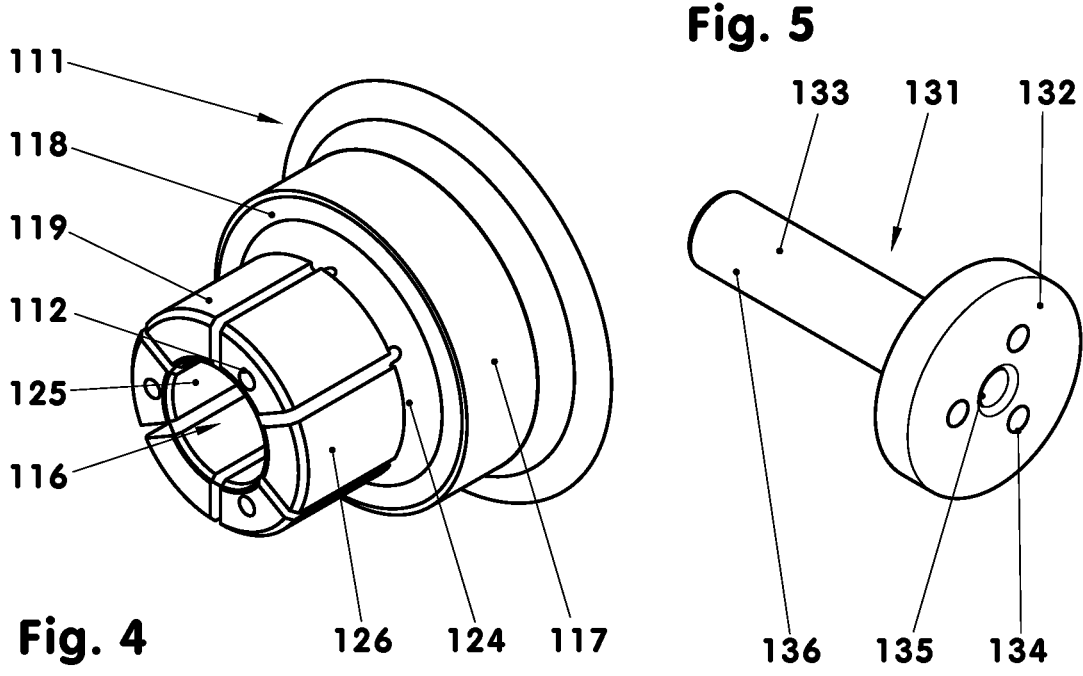
Fig. 4

105
142
99
83
146
147
143
94
141

144    145

101
103
91
153
84
152
151

99
95
83

163
162
94
161

164
105
96

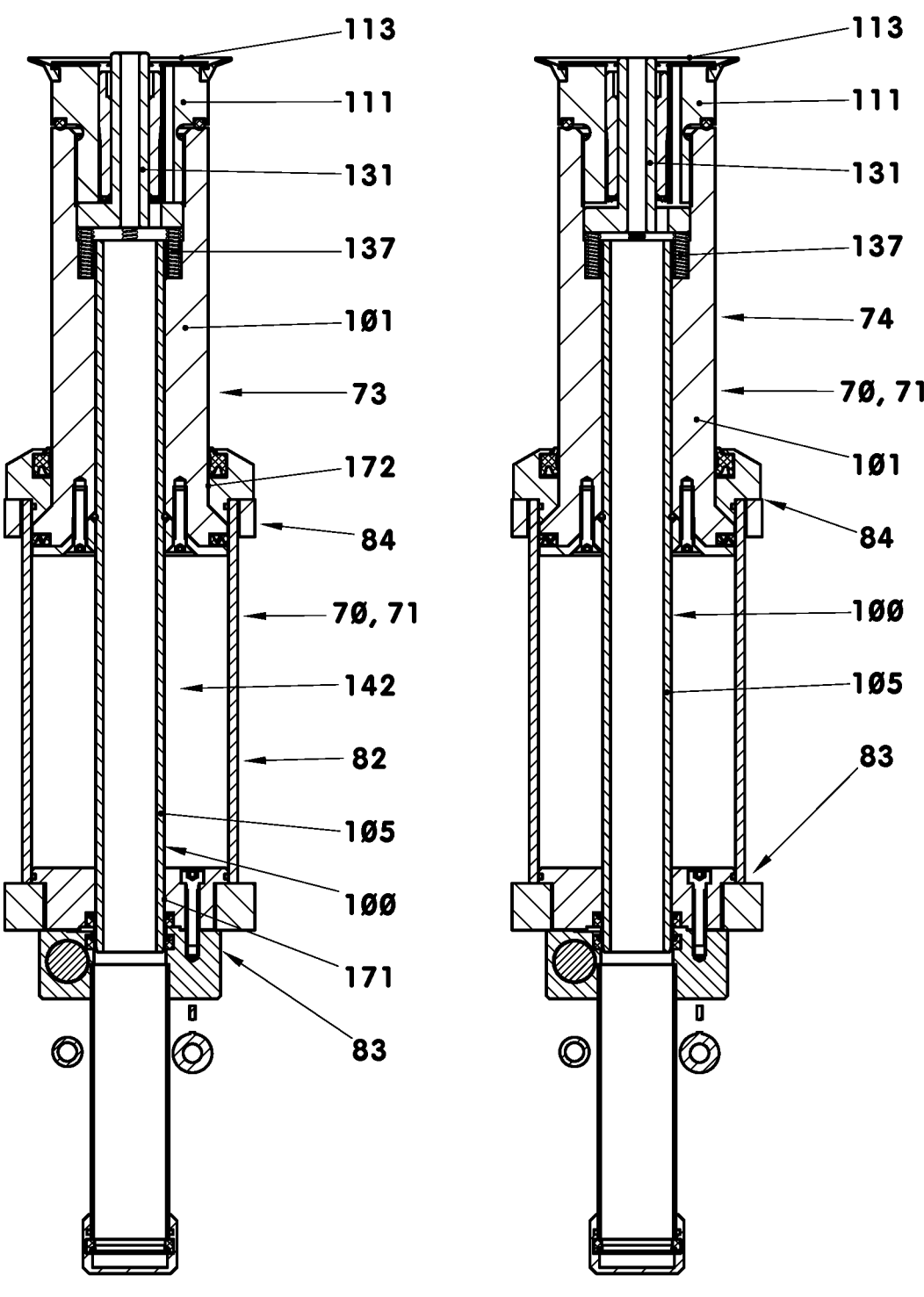
Fig. 9                                    Fig. 10

WORKPIECE-CLAMPING ELEMENT

CROSS-REFERENCE TO RELATED APPLICATION

This application is a national stage application, filed under 35 U.S.C. § 371, of International Patent Application PCT/DE2022/000049, filed on May 5, 2022, which claims the benefit of German Patent Application DE 10 2021 002 385.4, filed on May 5, 2021.

TECHNICAL FIELD

The disclosure relates to a workpiece-clamping element that has a cylinder and a lifting rod assembly guided in the cylinder with an annular piston and with an inner tube, wherein the lifting rod assembly carries a suction plate having a workpiece support surface, and to a workpiece table having a plurality of workpiece-clamping elements of this type.

BACKGROUND

A workpiece-clamping element is known from DE 103 50 572 A1. The height adjustment of such workpiece-clamping element takes place by means of an electric motor and a spindle.

SUMMARY

The present disclosure provides enables a short change-over time and a shortened throughput time for workpieces.

This is achieved with the features of the main claim. For this purpose, a cylinder bottom of the cylinder penetrated by the lifting rod assembly, the lifting rod assembly and a cylinder jacket tube of the cylinder delimit a pressure chamber. In addition, the lifting rod assembly is mounted both in the cylinder bottom and in the cylinder head so that it can be displaced at least axially.

In the workpiece-clamping element, the lifting rod assembly in the cylinder is mounted twice with a large bearing spacing. One of the bearing points is located in the cylinder bottom, the other bearing point is located in the cylinder head. The pressure chamber is located between the two bearing points, such that the bearing distance is greater than the total stroke of the workpiece-clamping element. This ensures a stable bearing when extending and retracting the lifting rod assembly, such that a high extension and retraction speed is possible. In addition, the large bearing spacing enables high forces and torques to be absorbed during workpiece processing. This means that workpiece processing can be carried out with high chip volumes.

Further details of the invention are given in the subclaims and the following description of schematically illustrated embodiments.

BRIEF DESCRIPTION OF THE DRAWINGS

FIG. 3: Sectional view of the lifting rod;
FIG. 4: Suction plate;
FIG. 5: Displacement rod.

FIG. 9: Workpiece-clamping element in the extended end position;
FIG. 10: Workpiece-clamping element in the operating position.

DETAILED DESCRIPTION

Figure 1:
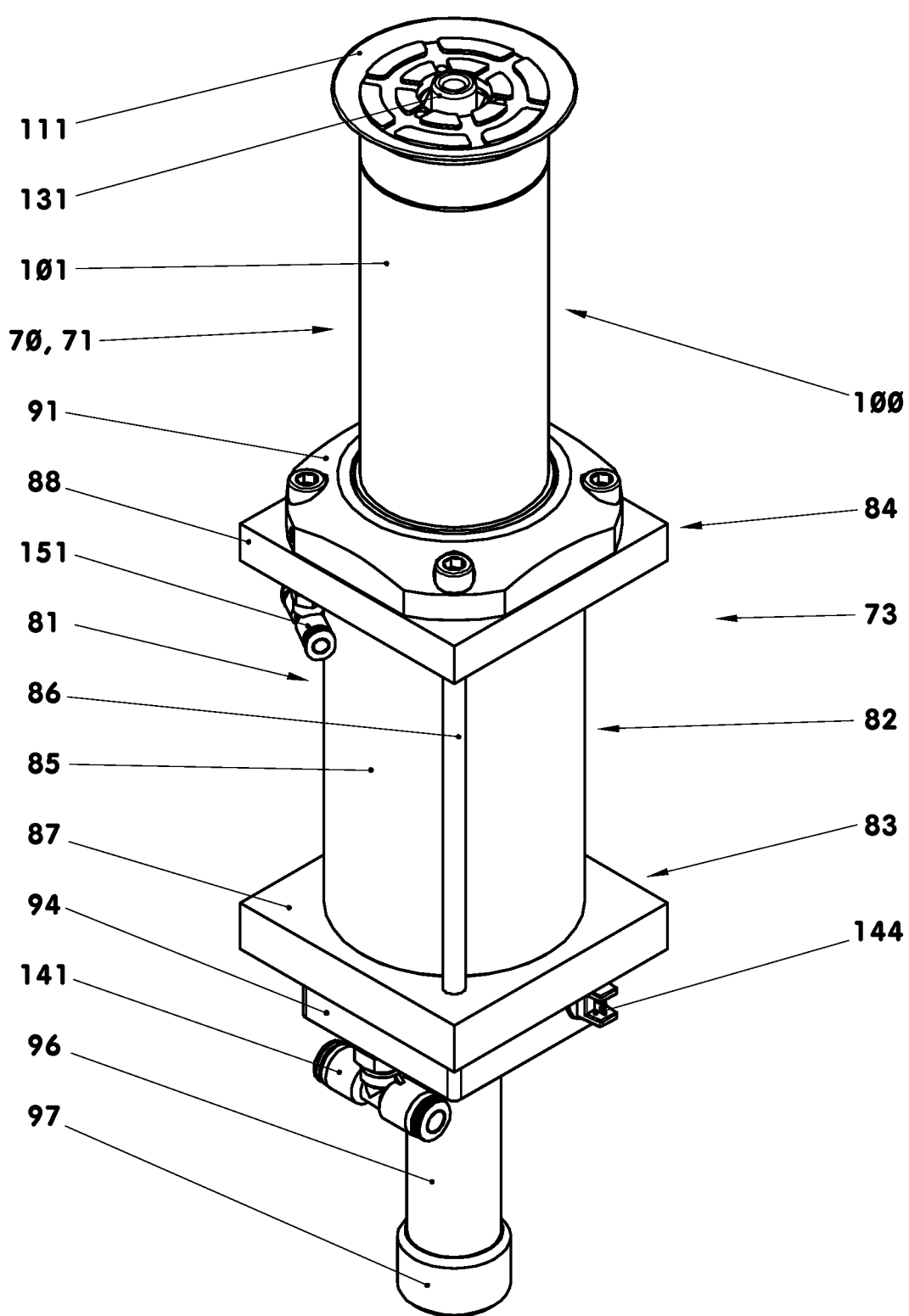
FIG. 1: Workpiece-clamping element.

FIGS. 1-11 show a workpiece-clamping element (70; 70) and some of its individual parts. Workpiece-clamping elements (70; 71) are used in workpiece tables (30), see FIG. 12, in order to fix workpieces (2; 3) for workpiece processing. For this purpose, the workpiece table (30) has at least one workpiece-clamping fixture (33; 34) with a plurality of workpiece-clamping elements (70; 71). The workpiece-clamping elements (70; 71) of a workpiece-clamping fixture (33; 34) are fastened in a carrier plate (55) of the workpiece table (30). Each workpiece-clamping element (70; 71) can be adjusted relative to the carrier plate (55) between a retracted end position (72) and an extended end position (73).

The individual workpiece-clamping elements (70; 71), for example, are identical to one another. In the workpiece-clamping fixture (33, 34), each of such workpiece-clamping elements (70; 71) can be controlled individually pneumatically, hydraulically and/or electrically. The signals of a measuring and/or testing system of each individual workpiece-clamping element (70; 71) can be recorded individually.

FIG. 1 shows a workpiece-clamping element (70; 71) in the extended end position (73) without a workpiece (2; 3) resting on it. The workpiece-clamping element (70; 71) has a cylinder-piston unit (82), the cylinder (81) of which is designed as a tie rod cylinder in this exemplary embodiment. The cylinder (81) has a cylinder bottom (83) with a plate-shaped cylinder bottom ring (87) and a cylinder head (84) with a plate-shaped cylinder head cover (88). The cylinder bottom ring (87) and the cylinder head cover (88) are parallel to one another, for example. Together they support a cylinder jacket tube (85). The cylinder jacket tube (85) has a constant internal diameter and a constant wall thickness over its length. A plurality of external tie rods (86) penetrate the cylinder bottom ring (87) and the cylinder head cover (88). In addition, such tie rods (86) penetrate a distribution cover (91) of the cylinder head (84) located on the cylinder head cover (88). In the representation in FIG. 1, the lifting rod assembly (100) with the suction plate (111) arranged on it projects from such distribution cover (91). A bottom distribution plate (94) of the cylinder bottom (83), for example, is screwed to the cylinder bottom ring (87). A protective tube (96) with a protective cap (97) at the bottom projects from the bottom distribution plate (94).

In the exemplary embodiment, the individual workpiece-clamping element (70; 71) has three pneumatic connections (141, 151, 161). Such pneumatic connections (141, 151, 161) are a lifting connection (141), a return lifting connection (151) and a suction connection (161). The return lifting connection (151) is arranged on the lower side of the cylinder head cover (88) in the representation in FIG. 1. In this representation, the lifting connection (141) and the suction connection (161) are arranged opposite one another on the lower side of the bottom distribution plate (94). Furthermore, a switching valve (144) for releasing and blocking the lifting connection (141) is arranged in the bottom distribution plate (94). The switching valve (144), for example a 3/2-way valve, is electromagnetically actuated in the exemplary embodiment. The use of a throttle valve is also conceivable. The lifting connection (141) and the return lifting connection (151) can also be designed as hydraulic connections.

Figure 2:
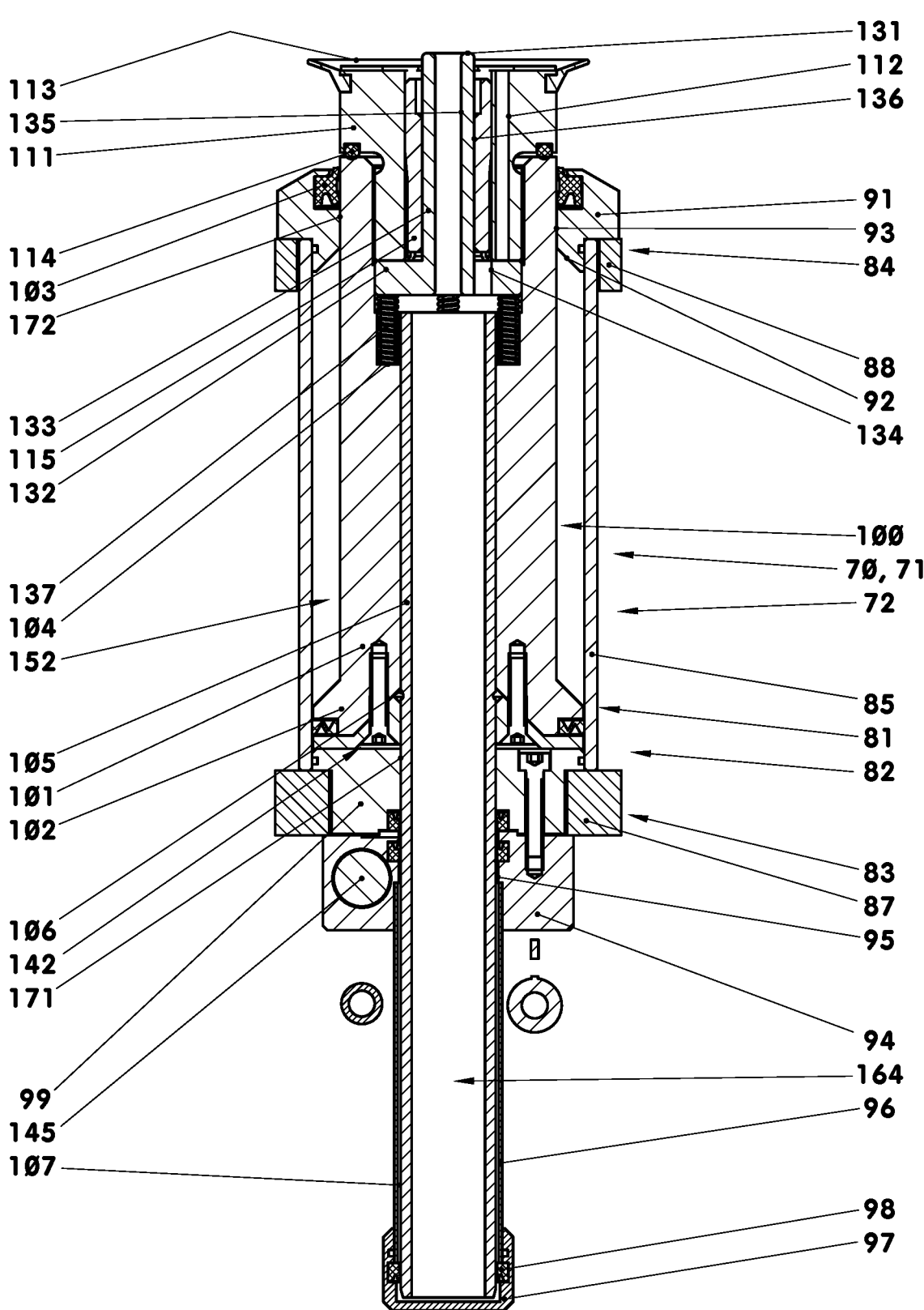
FIG. 2: Workpiece-clamping element in the retracted end position.

FIG. 2 shows a sectional view of a workpiece-clamping element (71; 70) in the retracted end position (72). The lifting rod assembly (100) is retracted such that the suction plate (111) only protrudes beyond the cylinder head cover (88) by a small amount, for example 9% of the total height of the retracted workpiece-clamping element (71; 70). The lifting rod assembly (100) is guided in a sealed manner in the distribution cover (91) and in the cylinder jacket tube (85). Thereby, the lifting rod assembly (100) is mounted in the cylinder head (84) so that it can move at least in the axial direction. The bearing point (172) in the cylinder head (84) is designed, for example, as a slide bearing (172).

The lifting rod assembly (100) has a lifting rod (101) in which an inner tube (105) is fastened. The inner tube (105) is oriented in the stroke direction of the lifting rod assembly (100). The lower end of the lifting rod (101) shown in FIGS. 1-2 is designed as an annular piston (102).

In the illustrated exemplary embodiment, this annular piston (102) delimits a displacement chamber (152) within the cylinder (81) from a pressure chamber (142). Thereby, the displacement chamber (152) is located between the annular piston (102) and the distribution cover (91) of the cylinder head (84). In the radial direction, the displacement chamber (152) is delimited by the cylinder jacket tube (85) of the cylinder (81).

The pressure chamber (142) is delimited by the cylinder bottom (83), the lifting rod assembly (100) and the cylinder jacket tube (85) of the cylinder (81). In the illustrated exemplary embodiment, the pressure chamber (142) is located between a bottom ring (99) of the cylinder bottom (83) seated in the cylinder bottom ring (87) and the annular piston (102).

The side of the annular piston (102) turned towards the distribution cover (91) is designed to be frustoconical. The imaginary cone tip is located on a center line of the workpiece-clamping element (70; 71) offset in the direction of the suction plate (111) in relation to the lifting piston (102). A frustoconical recess (92) complementary to the lifting piston (102) is formed in the distribution cover (91). This centers the lifting rod assembly (100) in the cylinder head (84) when the lifting rod assembly (100) is extended, i.e. at the maximum volume of the pressure chamber (142).

In the exemplary embodiment, the inner diameter of the displacement chamber (152) is 80% of the outer diameter of such displacement chamber (152). The inner diameter of the pressure chamber (142) is 35% of its outer diameter in the exemplary embodiment. Both the outer diameter of the displacement chamber (152) and the outer diameter of the pressure chamber (142) are determined by the cylinder (81), for example. This means that the piston pressure area of the annular piston (102) on the pressure chamber side is more than twice as large as the piston pressure area on the displacement chamber side.

The stroke of the lifting rod (101) relative to the cylinder (81) during extension is delimited, for example, by a stop of the annular piston (102) in the distribution cover (91). The retraction of the lifting rod (101) delimits, for example, the impact of the annular piston (102) on the bottom ring (99).

In the exemplary embodiment, the stroke of the lifting rod (101) is 35% of the total length of the workpiece-clamping element (70; 71) oriented in the stroke direction. Thus, the stroke of the lifting rod (102) is greater than 30% of the total length of the workpiece-clamping element (70; 71).

FIG. 3 shows a sectional view of the lifting rod (101). The annular piston (102) has a pressure plate (108) turned towards the pressure chamber (142). This is screwed to the piston base body (109), for example. Thereby, the pressure plate (108) secures a piston sealing element (121). This piston sealing element (121) is in contact with the inner wall of the cylinder (81) when the workpiece-clamping element (70; 71) is mounted. It hermetically separates the pressure chamber (142) from the displacement chamber (152), for example.

At its upper end, the lifting rod (101) has an internal thread (122). The suction plate (111) is screwed into such internal thread (122) when the workpiece-clamping element (70; 71) is mounted. Furthermore, the lifting rod (101) has, for example, four spring mounts (104). These are designed to be cylindrical, for example. In the representation in FIG. 3, they are arranged below the internal thread (122) and are open at the top.

FIG. 4 shows the suction plate (111) in an isometric bottom view. The suction plate has a central threaded bore (116). Below the workpiece support surface (113), the suction plate (111) has a cylindrical region (117). The thread of the threaded bore (116), for example, is formed within the cylindrical region (117). The cylindrical region (117) has an annular groove (118) at the bottom to accommodate a sealing ring (114).

The cylindrical region (117) is adjoined by six expanding jaws (119), for example, which are arranged on a common pitch circle. The individual expanding jaws (119) are each connected to the cylindrical region (117) by means of a living hinge (124). In a view of the suction plate (111) from below, the individual expanding jaw (119) covers an angle of 60 degrees, for example. The apex of such angle lies on a circle around the center line of the suction plate (111), the diameter of which is, for example, one sixteenth of the diameter of the workpiece support surface (113). Each of the expanding jaws (119) has an internal pressure surface (125). The pressure surface (125) can be designed to be wedge-shaped. On its outer side, the individual expanding jaw (119) can carry a threaded section (126). The suction channels (112) are formed in three of the expanding jaws (119) shown in FIG. 4.

When the workpiece-clamping element (70; 71) is mounted, the suction plate (111) is screwed into the free end of the lifting rod (101). The sealing ring (114) seals the lower side of the suction plate (111) against the lifting rod (101). The suction plate (111) has, for example, three suction channels (112) penetrating the suction plate (111) in its longitudinal direction. The diameter of the workpiece support surface (113) of the suction plate (111) is, for example, 95% of the diameter of the cylinder (81).

A clamping and guide sleeve (115) is screwed into the suction plate (111), for example. The clamping and guide sleeve (115) secures the position of the suction plate (111) relative to the telescopic tube (101). For example, to adjust the individual suction plates (111) to a common working plane, the clamping and guide sleeve (115) is released and fixed again after adjustment.

A displacement rod (131) is located in the clamping and guide sleeve (115), see FIG. 5. The displacement rod (131) has a carrier disk (132) and a thrust tube (133) formed centrally on the carrier disk (132). The, for example, plane-parallel carrier disk (132) has three apertures (134) oriented in the longitudinal direction of the displacement rod (131). A central channel (135) penetrates the carrier disk (132) and the thrust tube (133). The thrust tube (133) has a constant circular inner cross-sectional area along its length. The jacket surface (136) of the thrust tube (133) is designed to be coaxial with the inner cross-sectional area.

The spring mounts (104) of the telescopic tube (101) are turned towards the displacement rod (131). In each case, a spring energy store (137) is located in each of such spring mounts (104). In the exemplary embodiment, the spring energy store (137) is a compression spring (137). Such compression springs (137) load the displacement rod (131), which can be displaced relative to the telescopic tube (101), in the direction of the suction plate (111). When the spring energy stores (137) are relieved, see FIGS. 2 and 9, the carrier disk (132) is in contact with the suction plate (111). The free end of the thrust tube (133) protrudes, for example, 1.5 millimeters beyond the workpiece support surface (113) of the suction plate (111). In the case of loaded spring energy stores (137), see FIG. 10, the carrier disk (132) is only a short distance from the telescopic tube (101) or is in contact with it. In the representation in FIG. 10, for example, the thrust tube (133) is located slightly below the workpiece support surface (113) of the suction plate (111). The spring energy store (137) is loaded by means of negative pressure, which acts through the inner tube (105) on the carrier disk (132) and pulls it.

Figures 6, 7, 8:
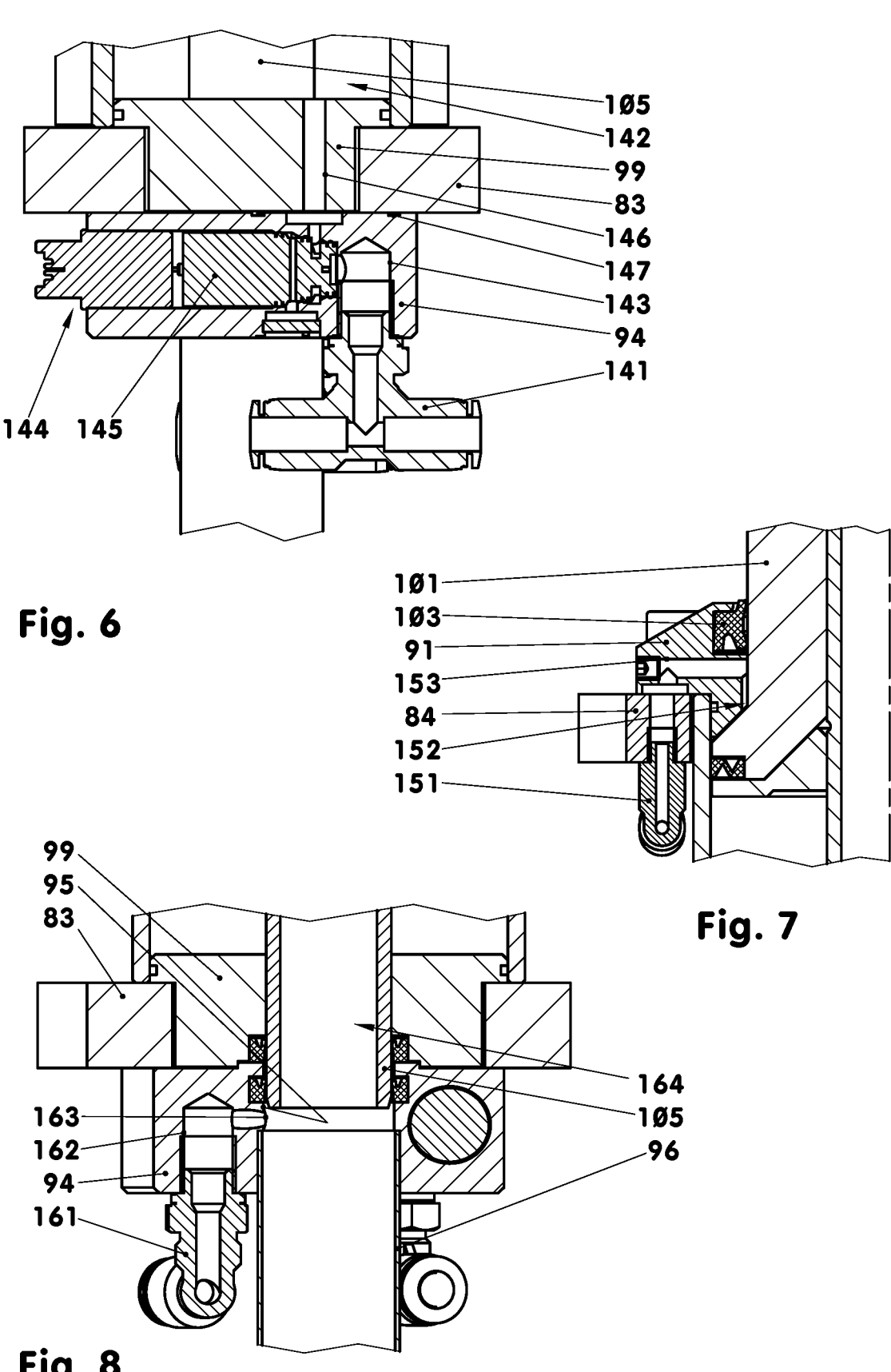
FIG. 6: Detail of the lifting connection.
FIG. 7: Detail of the return lifting connection.
FIG. 8: Detail of the suction connection.

FIG. 6 shows a detail of the lifting connection (141) and its connection to the pressure chamber (142). The pressure chamber (142) is shown in this representation with its maximum volume. The T-shaped lifting connection (141) is screwed into the bottom distribution plate (94). A first feed channel (143) runs in the bottom distribution plate (94) to a valve slide (145) of the switching valve (144). A second feed channel (146) runs from the valve slide (145) through the bottom ring (99) to the pressure chamber (142). A throttle channel (147) connects a second valve position with the surrounding area (1).

FIG. 7 shows the connection of the return lifting connection (151) to the displacement chamber (152). In this representation, the workpiece-clamping element (70; 71) is also in the extended end position (73). The return lifting connection (151) is screwed into the cylinder head cover (88). A return lifting channel (153) is guided into the distribution cover (91). There, the return lifting channel (153) opens below the cylinder seal (103) at the feed-through recess (93) of the distribution cover (91) in the displacement chamber (152).

The lifting rod (101) designed in tube form and the inner tube (105) are firmly connected to one another, for example by means of a wedge press connection (106). Upon a lifting movement of the lifting rod assembly (100), both the lifting rod (101) and the inner tube (105) are carried along with it. The inner tube (105) has a cylindrical inner wall and is open at both end faces. The inner diameter of the inner tube (105) is, for example, a quarter of the outer diameter of the cylinder jacket tube (85). In the exemplary embodiment, the length of the inner tube (105) is 2.3 times the stroke of the workpiece-clamping element (70; 71).

The lifting rod assembly (100) is mounted in the cylinder bottom (83) so that it can move at least in the stroke direction. For this purpose, in the exemplary embodiment the inner tube (105) and the bottom part (94) form a bearing point (172) designed as a slide bearing (171). Another design of the bearing is also conceivable.

In the retracted end position (72) shown in FIG. 2, the inner tube (105) projects into the protective tube (96). There is an annular gap (107) between the protective tube (96) and the inner tube (105) along the entire length of the protective tube (96). The protective cap (97) carries a shaft seal ring (98), into which the inner tube (105) is immersed during lowering.

FIG. 8 shows the suction connection (161) and the first section of the suction channel (162). In this representation as well, the lifting rod assembly (100) is extended to its maximum stroke. The suction connection (161) is screwed into the bottom distribution plate (94). The suction channel (162) leads at an angle to the inner wall (95) of the bottom distribution plate (94). Here, it flows into the central inner chamber (164) of the workpiece-clamping element (70; 71). In this representation, the opening cross-section (163) of the suction channel (162) is located between the inner tube (105) and the protective tube (96). The inner tube (105) is sealed against the bottom ring (99) and the bottom distribution plate (94). In the representation in FIG. 2, the inner tube (105) covers the opening cross-section (163). When the lifting rod assembly (100) is retracted, suction is blocked by means of the lifting rod assembly (100).

FIG. 9 shows the workpiece-clamping element (70; 71) with the lifting rod assembly (100) extended. The workpiece-clamping element (70; 71) is shown in its extended end position (73). The pressure chamber (142) has its maximum volume. The lifting rod (101) rests with its annular piston (102) in the conical recess (92) of the distribution cover (91). The inner tube (105) is in the position described in connection with the representation of FIG. 8, such that the suction connection (161) is pneumatically connected to the inner chamber (164), the inner tube (105) and the channel (135) of the thrust tube (133). The displacement rod (131) is extended, as described in connection with FIG. 2. For example, the carrier disk (132) of the displacement rod (131) blocks the suction channels (112) of the suction plate (111).

FIG. 10 shows an operating position (74) of the workpiece-clamping element (70; 71). The lifting rod assembly (100) is extended, as described in connection with FIG. 9. The displacement rod (131) is retracted relative to the suction plate (111). The compression springs (137) are compressed.

Figure 11:
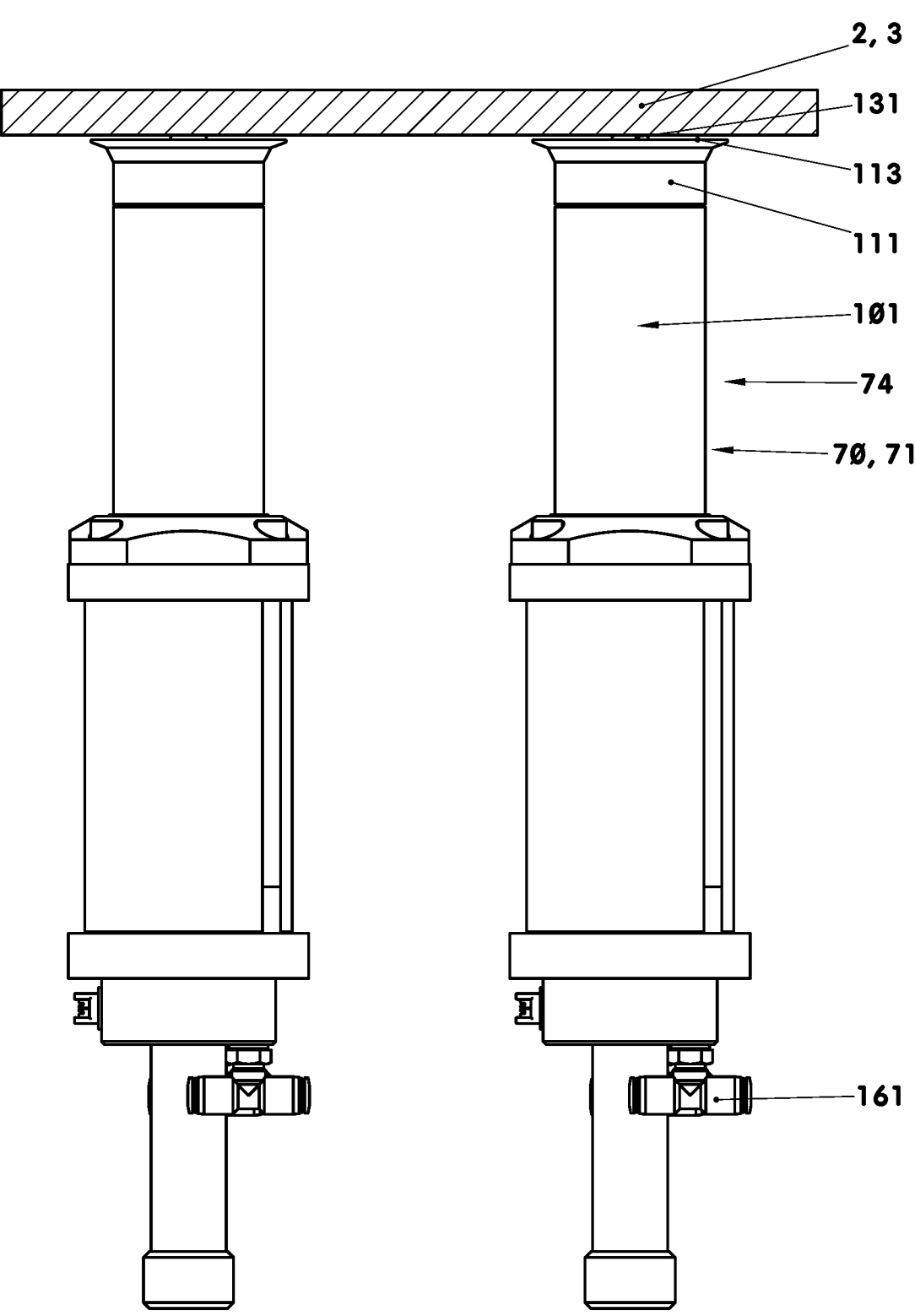
FIG. 11: Workpiece-clamping plate with lifted workpiece.

FIG. 11 shows two workpiece-clamping elements (70; 71) after processing a workpiece (2, 3). The workpiece (2, 3) rests on both workpiece-clamping elements (70; 71). The negative pressure for sucking in the workpiece (2, 3) is switched off. For example, ambient pressure prevails in the inner chamber (164) of the inner tube (105). The compression springs (137) are relieved. In this representation, the respective displacement rod (131) has been moved upwards relative to the suction plate (111), such that the carrier disk (132) is in contact with the suction plate (111). The thrust tube (133) protrudes over the workpiece support surface (113). The workpiece (2, 3) rests on the thrust tubes (133) and can be removed from them.

FIGS. 12-15 show a workpiece table (30). The workpiece table (30) has a frame (31) in which a workpiece plate carrier (32) with workpiece-clamping fixtures (33, 34) is pivotably mounted. In the representation in FIG. 12, the workpiece table (30) has two workpiece-clamping fixtures (33, 34). The workpiece-clamping sides (36, 37) of such workpiece-clamping fixtures (33, 34) point in opposite directions in this exemplary embodiment.

The pivot axis (35), about which the workpiece plate carrier (32) can be pivoted relative to the frame (31), is oriented horizontally in this exemplary embodiment. A pivot drive (51) is arranged on the frame (31) to drive the workpiece plate carrier (32). In the exemplary embodiment, the workpiece plate carrier (32) with the workpiece-clamping fixtures (33, 34) can be pivoted from the position shown in FIG. 12 through a pivot angle of 180 degrees around the pivot axis (35) and back again. However, it is also conceivable to arrange the workpiece plate carrier (32) so that it can rotate relative to the frame (31). In this case, the workpiece plate carrier (32) can be rotated 360 degrees or more about the axis of rotation. The pivot axis (35) or the axis of rotation of the workpiece table (30) can also be oriented vertically.

The workpiece plate carrier (32) can carry more than two workpiece-clamping fixtures (33, 34). In this case, the pivot or rotation angle between the individual positions is 360 degrees, divided by the number of workpiece-clamping fixtures (33, 34). In this case as well, each of the workpiece-clamping fixtures (33, 34) is oriented in a different direction.

Figure 13:
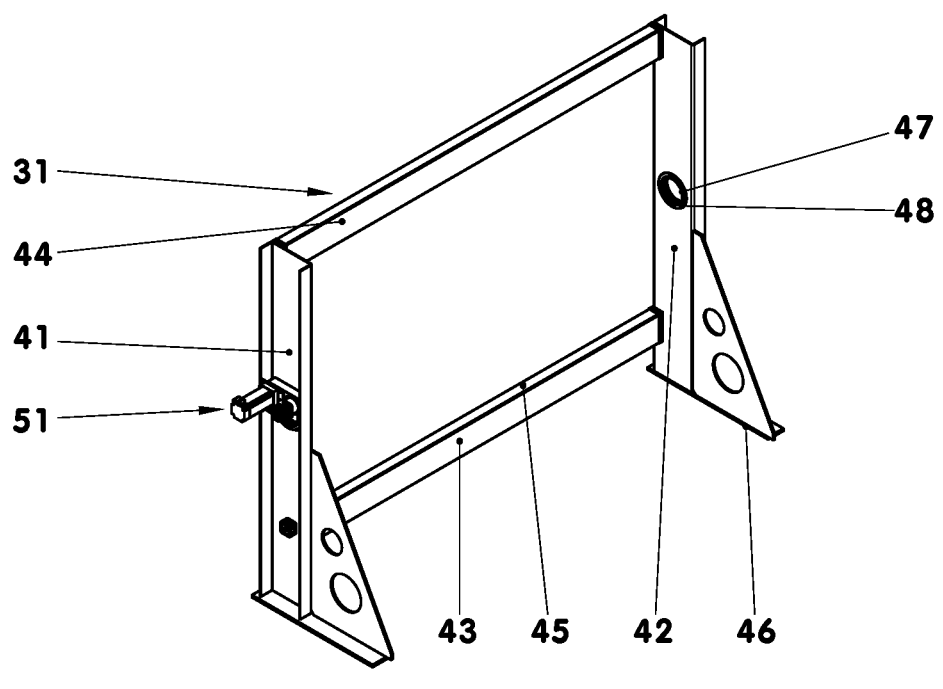
FIG. 13: Frame.

The frame (31) of the workpiece table (30), see FIG. 13, has two vertical carriers (41) spaced apart from one another, which are connected to one another by means of a lower longitudinal carrier (43) and an upper longitudinal carrier (44). The feet (46) at the bottom are arranged asymmetrically to the vertical carriers (41), for example. When in use, see FIG. 16, the feet (46) protrude further outwards than inwards.

Bearing points (47) for the pivot bearing of the workpiece plate carrier (32) are formed in the vertical carriers (41) in each case. For example, one roller bearing (48) is used in each case in the form of a slewing ring. This, for example multi-row, slewing ring (48) has, for example, radially oriented cylindrical rollers and an axially oriented spherical roller body. One of the bearing points can be designed as a fixed bearing point, the other as a floating bearing. It is also conceivable to design the bearing points (47) with spherical roller bearings, angular ball bearings, etc.

Figure 12:
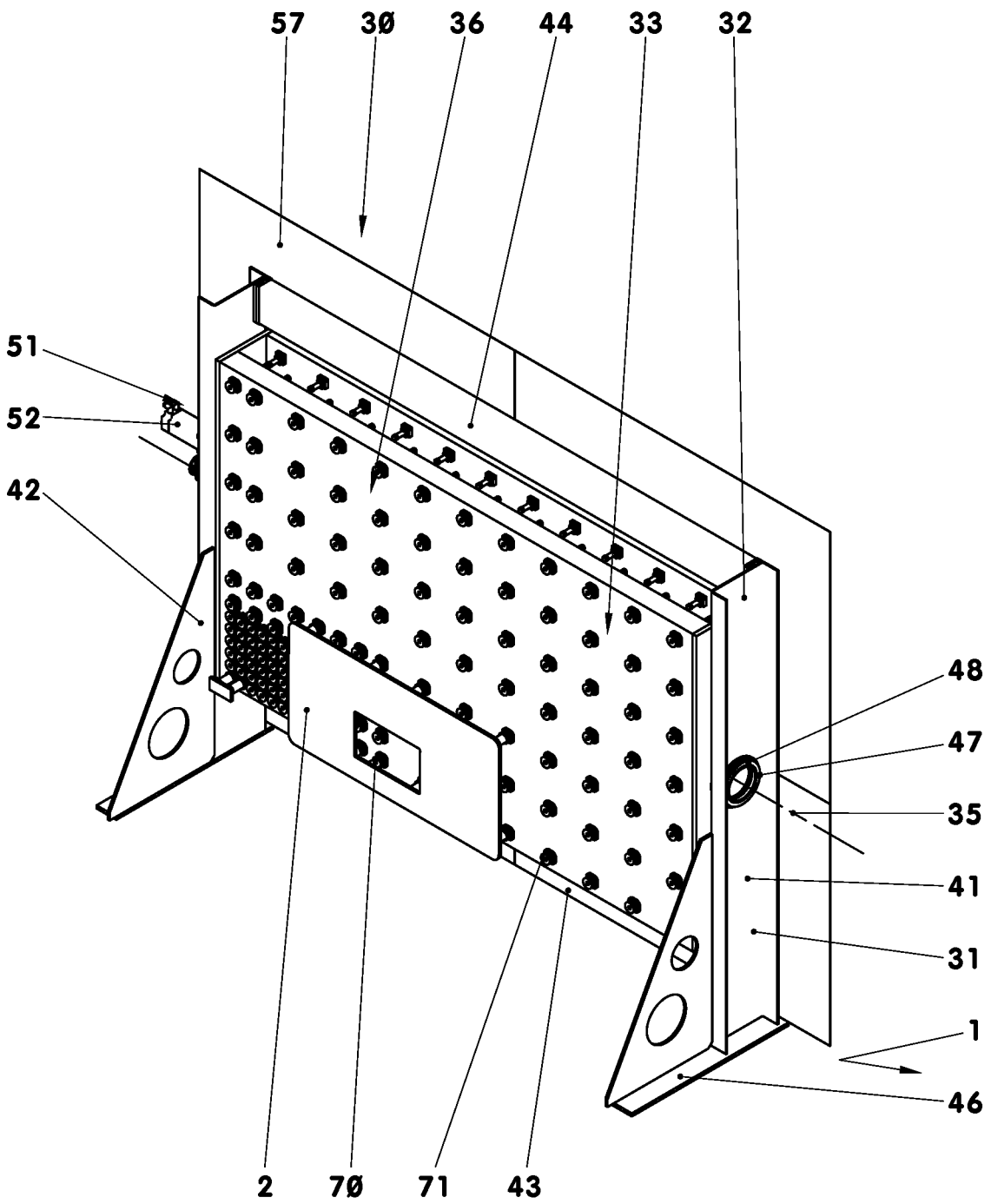
FIG. 12: Workpiece table.
Figure 16:
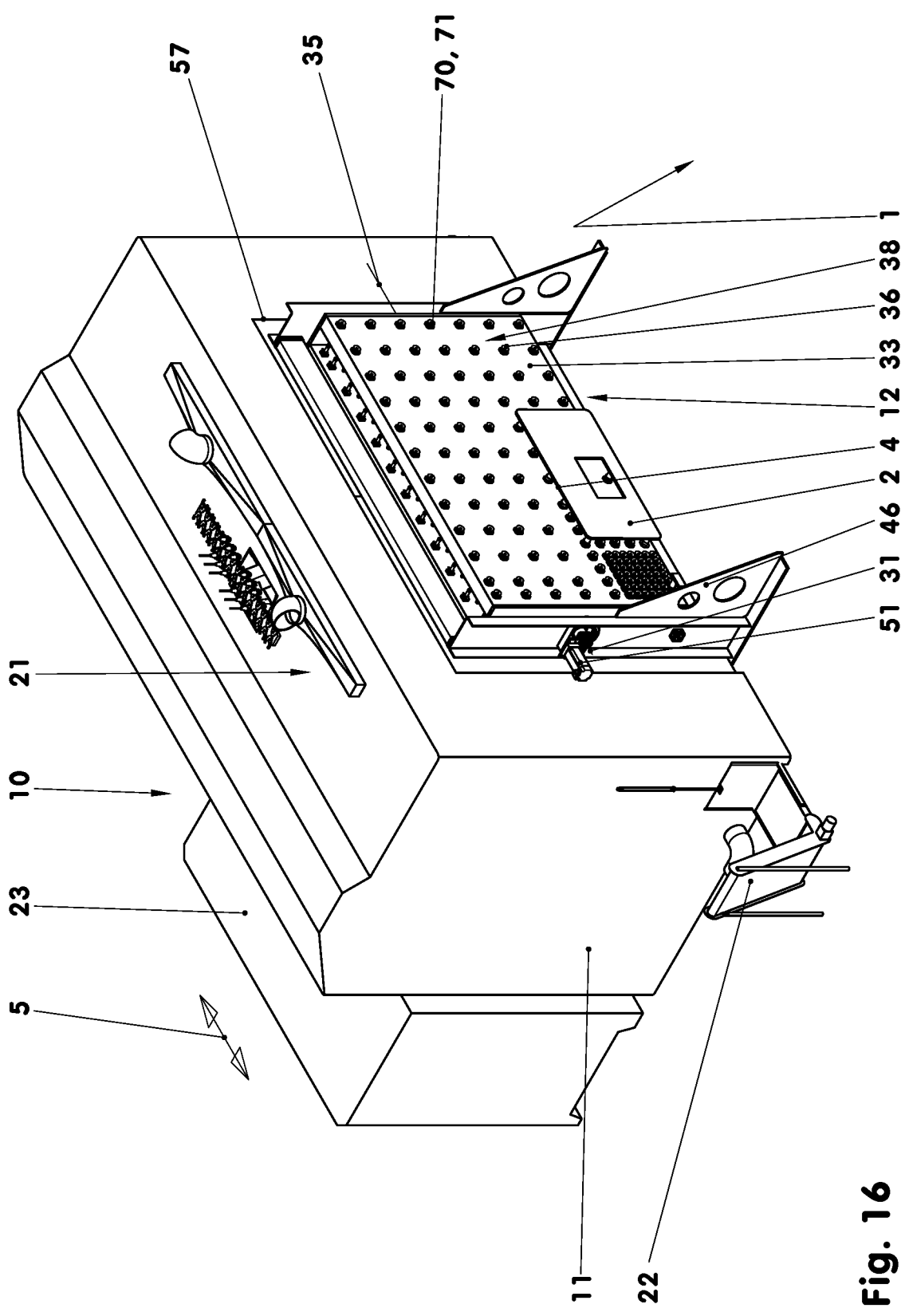
FIG. 16: Processing cell.

In the representations in FIGS. 12 and 16, outwardly projecting sealing plates (57) are arranged on the vertical carriers (41) and on the longitudinal carriers (43, 44). When using the workpiece table (30), see FIG. 16, such sealing plates (57) are in contact with the enclosure (11) of the processing cell (10), for example. In addition, one or more inflatable hoses, for example, can be used to create a seal between the workpiece table (30) and the enclosure (11). These are arranged, for example, both on the inner sides (42) of the vertical carriers (41) and on the inner sides (45) of the longitudinal carriers (43, 44). When a workpiece-clamping fixture (33; 34) is in a working chamber position, such, for example inflatable, air hoses surround such workpiece-clamping fixture (33; 34). Prior to pivoting the workpiece plate carrier (32), the air hoses can be relieved by draining or relocating the filling air. Other designs for sealing off the working chamber against the surrounding area (1) are also conceivable.

The pivot drive (51) is arranged on the left vertical carrier (41) in the representation in FIG. 12. This has an electric drive motor (52). In the exemplary embodiment, the drive motor (52) is an electric motor in the form of a geared motor. For example, it can be designed as a servomotor.

The pivot drive (51) further comprises a locking mechanism. By means of such locking mechanism, the workpiece plate carrier (32) can be locked relative to the frame (31) in at least one angular position in which one of the workpiece-clamping fixtures (33, 34) is in a vertical working chamber position, for example. In the exemplary embodiment, when one of the workpiece-clamping fixtures (33; 34) is in the working chamber position, exactly one other workpiece-clamping fixture (34; 33) is in a loading and removal position (38) outside the enclosure (11).

Figure 14:
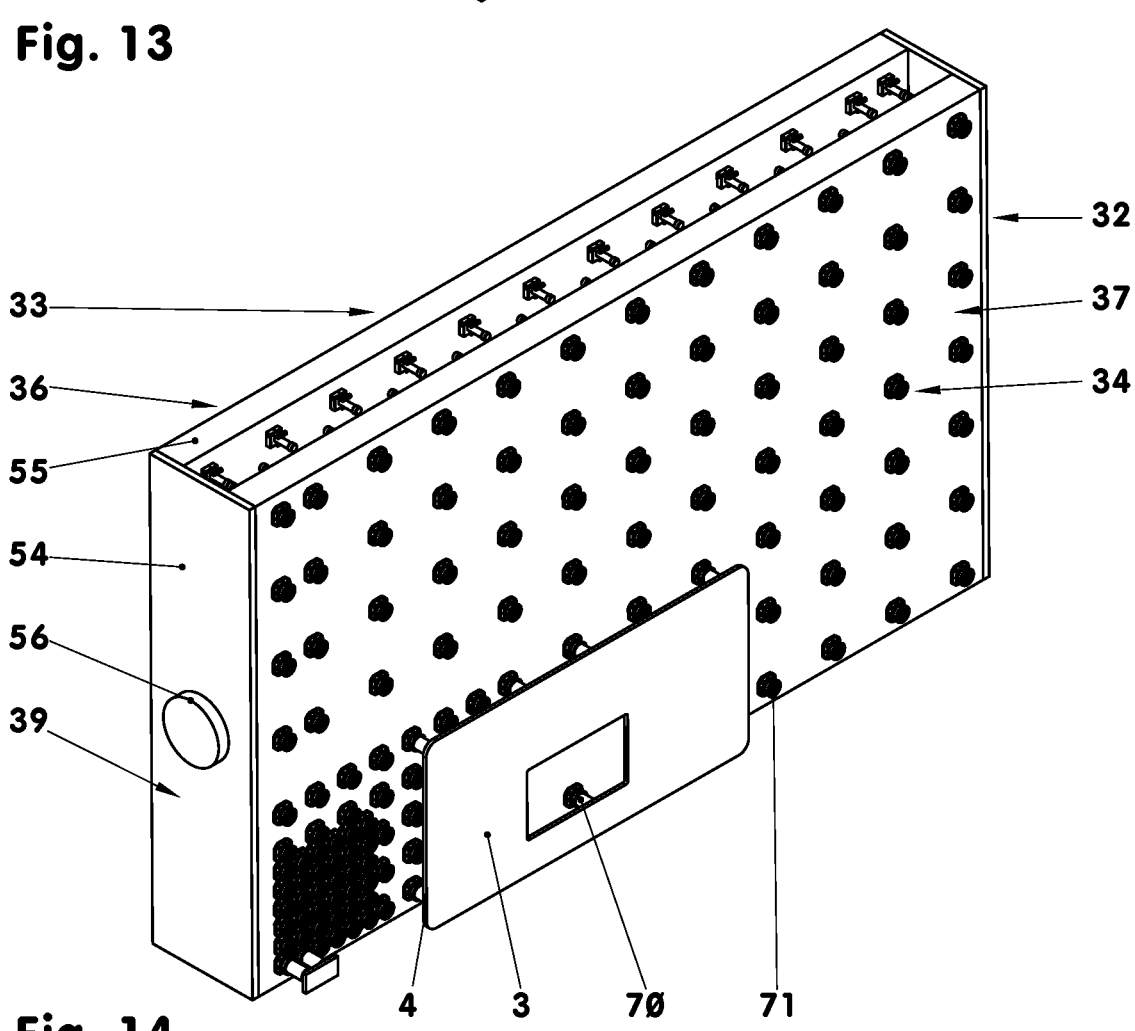
FIG. 14: Workpiece plate carrier with workpiece-clamping plates.

FIG. 14 shows the workpiece plate carrier (32). It comprises a carrier part (54) on both end faces (39), which are connected by means of two carrier plates (55). Each of the two carrier parts (54) carries a pivot pin (56), with which the workpiece plate carrier (32) is mounted in the frame (31) in the representations in FIGS. 12 and 16. The media supply to the workpiece plate carrier (32), for example, passes through such pivot pin (56). Such media supply comprises electrical power, control and data lines along with pneumatic and/or hydraulic control, pressure and suction lines.

In the exemplary embodiment, the two carrier plates (55) are arranged parallel to one another. Each of the carrier plates (55) determines a workpiece-clamping side (36, 37). The surface of the individual workpiece-clamping side (36, 37) corresponds, for example, to the maximum workpiece support surface. In the exemplary embodiment, workpieces with a length of up to 3600 millimeters and a width of up to 2100 millimeters can be clamped on each of the workpiece-clamping fixtures (33; 34). The thickness of the individual carrier plate (55) is, for example, 4% of its length.

In one version of the workpiece table (30) with three workpiece-clamping fixtures (33, 34), this has three carrier plates (55). Such carrier plates (55) are arranged in an equilateral triangle in an end view of the workpiece table (30). When viewed in the longitudinal direction (5) of the pivot axis (35) or the axis of rotation, the individual workpiece-clamping fixture (33; 34) is vertical in the loading and removal position (38) in the exemplary embodiment. However, the workpiece-clamping fixture (33; 34) can also form an angle of up to and including 30 degrees with a vertical plane that contains the pivot axis (35) or the axis of rotation, wherein the cutting line lies above the pivot axis (35) or the axis of rotation. For example, each carrier plate (55) has the same maximum workpiece support surface. It is also conceivable to design the workpiece table (30) with more than three workpiece-clamping fixtures (33, 34).

Each carrier plate (55) carries a workpiece-clamping fixture (33; 34). In the exemplary embodiment, the two workpiece0clamping fixtures (33; 34) are designed to be identical to one another. However, it is also conceivable to use differently designed workpiece-clamping fixtures (33; 34) on the individual carrier plates (55).

The individual workpiece-clamping fixture (33; 34) has a plurality of workpiece-clamping elements (70; 71). In the exemplary embodiment, these are arranged in rows and columns on the carrier plate (55). The arrangement of the workpiece-clamping elements (70; 71) is compacted in a region at the bottom left of the representation in FIG. 14. With such matrix-like arrangement, the distance between the workpiece-clamping elements (70; 71) arranged next to one another in a row within the respective compaction region corresponds, for example, to the distance between the workpiece-clamping elements (70; 71) arranged one above the other in a column. Such distances can also be designed differently.

The workpiece-clamping elements (70; 71) can also be arranged, for example, in concentric circles, spirals, along a diagonal pattern, etc. The formation of a plurality of regions with different compaction is also conceivable.

Figure 15:
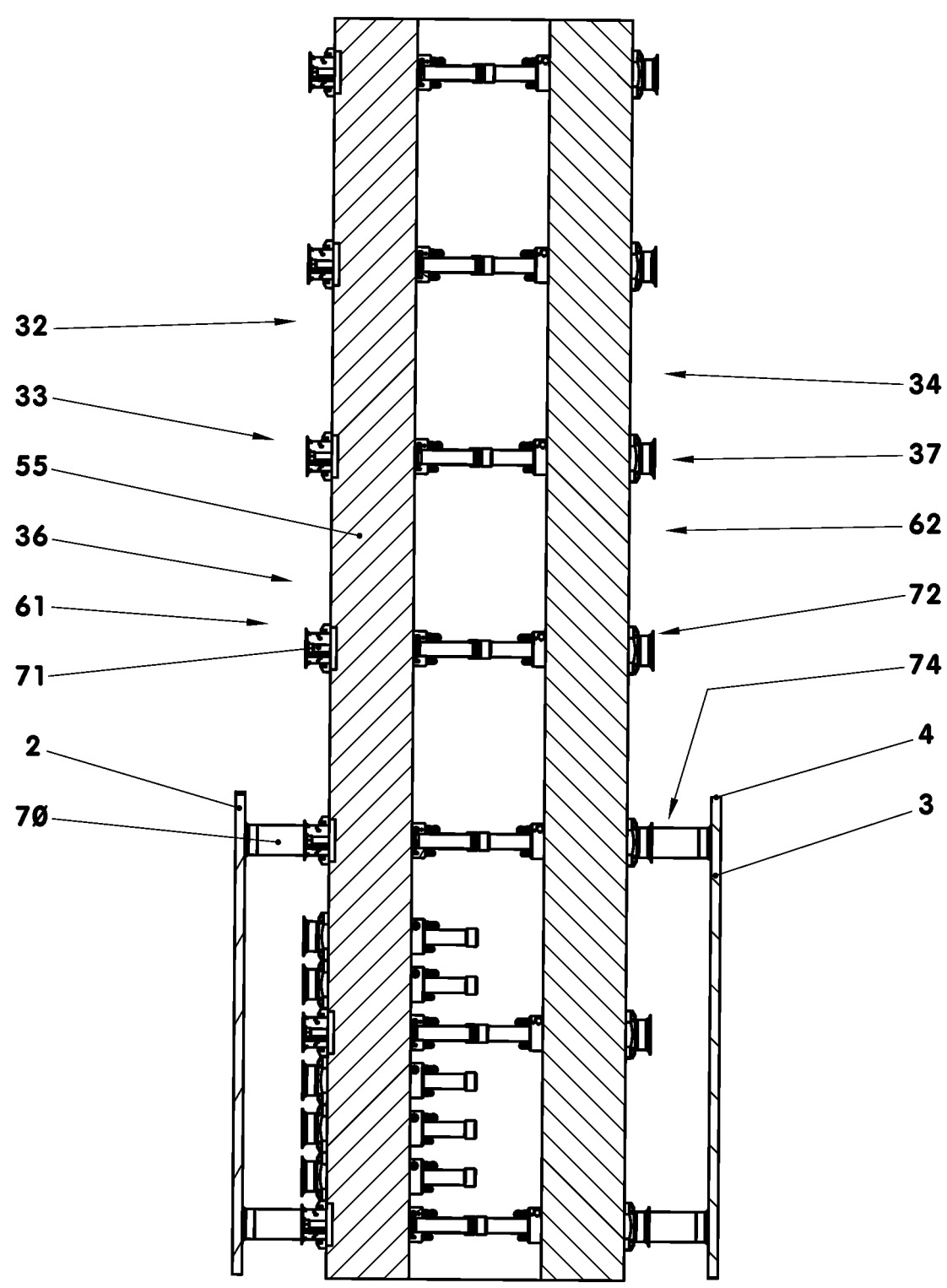
FIG. 15: Cut of the workpiece-clamping plates.

FIG. 15 shows a sectional representation of the workpiece plate carrier (32) with the workpiece-clamping fixtures (33, 34). In this representation, for example, an current loading side (61) is shown on the left and an current working chamber side (62) on the right. The individual workpiece-clamping elements (70; 71) in each case penetrate a carrier plate (55) and are fastened to it. Each workpiece-clamping element (70; 71) has a cylinder (81) and the lifting rod (101), which can be adjusted hydraulically or pneumatically relative to the cylinder (81). The suction plate (111) is arranged at the free end of the lifting rod (101). The lifting rod (101) is aligned normal to the carrier plate (55). The stroke of the workpiece-clamping element (70; 71) is 100 millimeters, for example. The diameter of the cylinder (81) is, for example, 70% of the stroke.

The loading side (61) and the working chamber side (62) in each case carry a workpiece (2; 3) in the representation in FIG. 15. This rests in each case on two workpiece-clamping elements (70). These two workpiece-clamping elements (70) are in an operating position (74), in which the telescopic tube (101) is fully extended. The displacement rod (131) is retracted. The remaining workpiece-clamping elements (71) are shown in a retracted end position (72). The adjustment of the workpiece-clamping elements (70; 71) can also take place in steps between the retracted end position (72) and an extended end position (73). It is also conceivable, for example, to steplessly adjust any intermediate position between the retracted end position (72) and the extended end position (73). In the exemplary embodiment shown, the adjustment of the workpiece-clamping elements (70; 71) takes place pneumatically.

The workpiece table (30) shown in FIGS. 12-15 has a frame (31) that carries and/or stores two or more workpiece-clamping fixtures (33; 34). The workpiece-clamping fixtures (33, 34) can also be located in a common plane or in a plurality of mutually offset planes. The planes can be arranged horizontally or at an angle, for example. For example, the workpiece-clamping fixtures (33, 34) can then be moved relative to one another. Thereby, the direction of movement can be linear or along a curved path. The workpiece-clamping fixtures (33, 34) can be adjusted individually, in groups or together relative to the frame (31). In such cases, each of the workpiece-clamping fixtures (33; 34) has at least one loading and removal position (38) and at least one working chamber position. In the respective working chamber position, each workpiece (2, 3) clamped on the workpiece-clamping fixture (33; 34) can be processed by the processing unit of the industrial robot, for example.

Instead of a workpiece table (30) with a plurality of workpiece-clamping fixtures (33, 34), a workpiece table (30) with a single workpiece-clamping fixture (33; 34) can also be used. This workpiece-clamping fixture (33; 34) has a plurality of workpiece-clamping elements (70; 71). These can be arranged as described above.

FIG. 16 shows a processing cell (10). The processing cell (10) has an internal working chamber that is surrounded by an enclosure (11). Such enclosure (11) has an overhead air supply device (21). A chip conveyor (22) is arranged in the longitudinal direction (5) of the processing cell (10), which conveys chips accumulating in the working chamber out of the enclosure (11). In such representation, there are control cabinets (23) next to the enclosure (11). The control unit for workpiece processing is located in such control cabinets (23). In the exemplary embodiment, processing is carried out with a stationary workpiece (2; 3) by means of a processing robot.

The workpiece table (30) is arranged in the enclosure (11) on a loading side (12) of the processing cell (10). The workpiece table (30) is integrated into the enclosure (11). The workpiece table (30) delimits the working chamber of the processing cell (10). The workpiece-clamping fixture (33), which is oriented towards the surrounding area (1) in this representation, is in the loading and removal position (38).

In the material flow of the processing cell (10), a workpiece (2; 3) to be processed is placed on the workpiece-clamping fixture (33; 34), for example by means of a handling device or by hand, and held there by means of negative pressure. In order to process the workpiece (2, 3), the workpiece (2, 3) is pivoted about the pivot axis (35) into the working chamber by means of the workpiece plate carrier (32). At the same time, the other workpiece-clamping fixture (34; 33) with, for example, a processed workpiece (3; 2) moves from the working chamber to the loading and removal position (38). In both positions, the workpiece table (30) seals the processing cell (10) against the surrounding area (1). The processed workpiece (3; 2) can now be removed by means of a handling tool or by hand and fed for further processing.

When the processing cell (10) and/or the workpiece table (30) is in a resting state, all workpiece-clamping elements (70; 71) are in the respective retracted end position (72). The lifting connections (141), the return lifting connections (151) and the suction connections (161) are depressurized, for example. If necessary, the lifting connections (141) and/or the return lifting connections (151) can be in a blocked position, such that the respective pressure chamber (142) and/or the displacement chamber (152) are completely separated from the surrounding area (1) and from the compressed air supply.

For clamping a workpiece (2; 3) onto the workpiece-clamping fixture (33; 34), the lifting connections (141) of individual workpiece-clamping elements (70; 71) are connected to the compressed air supply, for example. The return lifting connections (151) of all workpiece-clamping elements (70; 71) are subjected to a constant pressure of, for example, 3 bar. The lifting connections (141) can, for example, be connected separately from the return lifting connections (151) to one or more pressure sources. In the case of hydraulically actuated workpiece-clamping elements (70; 71), these can be integrated in a closed hydraulic circuit, such that the annular piston (102) is pressurized on both sides.

It is also conceivable to connect the lifting connections (141) and the return lifting connections (151) to the same pressure source. By means of the switching valve (144) connected upstream of the pressure chamber (142), the pressure chamber (142) can be pressurized simultaneously with the displacement chamber (152). The pressure chamber (142) and the displacement chamber (152) are subjected to the same pressure, for example the specified pressure value. The surface of the annular piston (102) turned towards the pressure chamber (142) is larger than the surface of the annular piston (102) turned towards the displacement chamber (152). When the switching valve (144) is switched to the flow position, the lifting rod (101) is extended. If the switching valve (144) is switched to the relief position, the air is displaced from the pressure chamber (142) through the throttle channel (147) into the surrounding area (1). The pressure in the displacement chamber moves the lifting rod assembly (100) into its retracted starting position.

When setting up such an arrangement, the lifting connection (141) and the return lifting connection (151) can be directly connected to one another. Such connecting line can be connected to the pressure source. The switching valve (144) is connected downstream of the lifting connection (141).

The displacement chamber (152) can also be connected to a compressed air reservoir separate from the compressed air network or form a compressed air reservoir. The use of a spring energy store, for example in the form of a gas spring, a coil spring designed as a compression spring, etc., is also conceivable.

The selection of the workpiece-clamping elements (70; 71) released by means of a control unit, for example, depends on the geometry of the workpiece (2; 3) to be processed and on the processing steps provided in the processing cell (10). If, for example, a aperture is to be created in the workpiece (2; 3), the workpiece-clamping elements (70; 71) located in this region—after the workpiece (2; 3) has been clamped—are not released. The non-released workpiece-clamping elements (70; 71) remain in their retracted end position (72) as shown in FIG. 2. If the processing of one or more edges (4) is provided, only workpiece-clamping elements (70; 71) for which a minimum distance to the processed edge (4) of the workpiece (2; 3) is guaranteed are released. This minimum distance is five millimeters, for example.

In the released workpiece-clamping elements (70; 71), the pressure chamber (142) is pressurized, for example with a pressure medium, for example compressed air. This takes place, for example, by switching the, for example, electro-magnetically actuated, bistable switching valve (144) of such workpiece-clamping element (70; 71). The lifting rod assembly (101) moves against the pressure of the displace-ment chamber (152) relative to the cylinder (81) into the extended end position (73), see FIG. 9. The lifting rod (101), the inner tube (105) and the suction plate (111) are moved. Centering the lifting rod assembly (100) in the cylinder head (84) increases the transverse rigidity of the workpiece-clamping element (70; 71), for example. The workpiece-clamping elements (70; 71) are held in the extended end position (73), for example by maintaining the pressure or by blocking the respective switching valve (144). For example, the annular piston (102) is thus firmly clamped. In the non-released workpiece-clamping elements (71; 70), for example, the pressurization of the displacement chamber (152) is maintained. The lifting rod assembly (100) is mounted in the cylinder bottom (83) in the retracted state, in the extended state and during the entire lifting movement by means of the first bearing point (171) and in the cylinder head (84) by means of the second bearing point (172).

When the lifting rod assembly (100) is extended relative to the cylinder (81), the inner tube (105) from the represen-tation of FIG. 2 is moved upwards. For example, the lifting rod assembly (100) only releases the opening cross-section (162) when the extended end position (73) of the workpiece-clamping element (70; 71) is reached. A pneumatic connec-tion is established between the suction connection (161) and the suction plate (111).

Negative pressure is applied to the individually extended workpiece-clamping element (70; 71) via the suction con-nection (161). Thereby, the air is sucked out of the respective suction connection (161). In such workpiece-clamping ele-ments (70; 71), the air is extracted through the inner tube (105) by the displacement rod (131). For example, the displacement rods (131) are sucked in the direction of the telescopic tubes (101) while the spring energy stores (137) are loaded. If negative pressure is applied to a retracted workpiece-clamping element (71; 70), the inner tube (105) together with the shaft seal ring (98) blocks the suction of such workpiece-clamping element (71; 70).

The workpiece (2; 3) is initially placed manually or by means of a handling device in the specified position on the workpiece support surfaces (113) of the suction plates (111). Thereby, the workpiece is placed against, for example, extendable contact pins for centering. The workpiece (2; 3) is pulled against the suction plates (111) and fixed to the workpiece table (30) by means of the workpiece-clamping fixture (33; 34). The air is further extracted through the suction channels (112) of the suction plates (111), the respective displacement rod (131) and the respective inner tube (105). If necessary, the suction pressure can be adjust-able. For example, it can be reduced during the alignment of the workpiece. This makes it easier to correct the workpiece location (2; 3) during positioning, for example.

During the pivoting of the workpiece table (30) and during processing of the workpiece (2; 3) or workpieces (2, 3), the media control of the workpiece-clamping elements (70; 71) remains unchanged. The workpiece (2; 3) is thus held securely in its position during processing.

During the main time of the processing cell (10), in which the last workpiece (2; 3) or the last group of workpieces (2; 3) clamped is processed, for example by cutting, the next workpiece (3; 2) or the next group of workpieces (3; 2) is prepared on the loading side (12) of the enclosure. Clamping on the workpiece-clamping fixture (34; 33) in the loading and removal position (38) is carried out as described above. The processing of the workpiece (2; 3) is carried out, for example, by means of the industrial robot arranged inside the enclosure (11), which carries a processing unit with a plurality of driven tools.

After processing is complete, the workpiece table (30) is pivoted in such a manner that the processed workpiece (2; 3) is in the loading and removal position (38). At the same time, the current loading side (61) is pivoted into the working chamber. No set-up of the workpiece (2; 3) or the work-pieces (2; 3) is required in the working chamber. For example, the non-productive time for processing a batch of workpieces (2; 3) is limited to pivoting the workpiece table (30).

The processed workpiece (2; 3) is gripped by means of the handling device or by hand. The differential pressure between the suction pressure and the ambient pressure is reduced or the suction is switched off. The spring energy stores (137) are relieved and press the carrier disk (132) in the direction of the suction plate (111). The workpiece (2; 3) is lifted off the suction plates (111) by means of the dis-placement rods (131), see FIG. 11. The processed workpiece (2; 3) can now be removed from the workpiece-clamping elements (70; 71) with virtually no resistance. A new work-piece (3; 2) can then be clamped onto the workpiece table (30) for processing.

If the newly clamped workpiece has different geometric dimensions, other or additional workpiece-clamping ele-ments (70; 71) can be used to fix the workpiece (2; 3). The release of further workpiece-clamping elements (70; 71) takes place as described above.

If individual workpiece-clamping elements (70; 71) are no longer required for processing further workpieces (3; 2), they are moved to the retracted end position (72). For example, the switching valve (144) is switched such that the pressure chamber (142) is connected to the surrounding area (1) via the throttle channel (147). The pressure in the displacement chamber (152) displaces the telescopic tube (101) into the retracted position. When the lifting rod assembly (100) is retracted, it blocks the pneumatic connec-tion between the suction connection (161) and the suction plate (111).

Combinations of the individual exemplary embodiments are also conceivable.

13                                                    14

LIST OF REFERENCE SIGNS

106 Wedge press connection
107 Annular gap
1 Surrounding area
108 Pressure plate
2 Workpiece
109 Piston base body
3 Workpiece
111 Suction plate
4 Edges of (2; 3)
112 Suction channels in (111)
5 Longitudinal direction
113 Workpiece support surface of (111)
10 Processing cell
114 Sealing ring
11 Enclosure
115 Clamping and guide sleeve
12 Loading side
116 Threaded bore
21 Air supply device
117 Cylindrical region
22 Chip conveyor
118 Annular groove 118
23 Control cabinets
119 Expanding jaws 119
30 Workpiece table
121 Piston sealing element
31 Frame
122 Internal thread
32 Workpiece plate carrier
124 Living hinge
33 Workpiece-clamping fixture
125 Pressure surface
34 Workpiece-clamping fixture
126 Threaded section
35 Pivot axis
131 Displacement rod
36 Workpiece-clamping side
132 Carrier disk
37 Workpiece-clamping side
133 Thrust tube
38 Loading and removal position
134 Apertures
39 End faces of (32)
135 Channel
41 Vertical carrier
136 Jacket surface
42 Inner sides of (41)
137 Spring energy store, compression spring
43 Lower longitudinal carrier
141 Pneumatic connection, lifting connection
44 Upper longitudinal carrier
142 Pressure chamber
45 Inner sides of (43, 44)
143 First feed channel
46 Feet
144 Switching valve
47 Bearing points
145 Valve slide
48 Roller bearing, slewing ring
146 Second feed channel
51 Pivot drive
147 throttle channel
52 Drive motor of (51)
151 Pneumatic connection, Return lifting connection
54 Carrier part
152 Displacement chamber
55 Carrier plates
153 Return lifting channel
56 Pivot pin
161 Pneumatic connection, suction connection
57 Sealing plates
162 Suction channel
61 Current loading side
163 Opening cross-section of (162)
62 Current working chamber side
164 Inner chamber of (70, 71)
70 Workpiece-clamping elements
171 Bearing point, slide bearing
71 Workpiece-clamping elements
172 Bearing point, slide bearing
72 Retracted end position

The invention claimed is:

73 Extended end position
1. A workpiece-clamping element (70; 71), comprising:
74 Operating position
a cylinder (81);
81 Cylinder
a lifting rod assembly (100), which is guided in the
82 Cylinder-piston unit
cylinder (81) and has
83 Cylinder bottom
an annular piston (102) and
84 Cylinder head
an inner tube (105);
85 Cylinder jacket tube
a suction plate (111) having a workpiece support surface
86 Tie rods
(113), the suction plate (111) being carried by the lifting
87 Cylinder bottom ring
rod assembly (100);
88 Cylinder head cover
a displacement rod (131) loaded by at least one spring
91 Distribution cover
energy store (137) mounted in the suction plate (111);
92 Recess, frustoconical in (91)
and
93 Feed-through recess of (91)
a pressure chamber (142) delimited by
94 Bottom distribution plate
a cylinder bottom (83) of the cylinder (81) penetrated
95 Inner wall of (94)
by the lifting rod assembly (100),
96 Protective tube
the lifting rod assembly (100), and
97 Protective cap
a cylinder jacket tube (85) of the cylinder (81),
98 Shaft seal ring in (97)
wherein the lifting rod assembly (100) is mounted at least
99 Bottom ring
axially displaceably both in the cylinder bottom (83)
100 Lifting rod assembly
and in a cylinder head (84), and
101 Telescopic tube, lifting rod
wherein the displacement rod (131) protrudes beyond the
102 Lifting piston, annular piston
workpiece support surface (113) when the at least one
103 Cylinder seal
spring energy store (137) is relieved.
104 Spring mounts in (101)
2. The workpiece-clamping element (70; 71) according to
105 Inner tube
claim 1, wherein the cylinder head (84), the lifting rod assembly (100) and the cylinder jacket tube (85) delimit a displacement chamber (152).

3. The workpiece-clamping element (70; 71) according to claim 1, wherein the lifting rod assembly (100) is centered in the cylinder head (84) when the pressure chamber (142) has a maximum volume.

4. The workpiece-clamping element (70; 71) according to claim 1, wherein a distance of the workpiece support surface (113) relative to the annular piston (102) is adjustable.

5. The workpiece-clamping element (70; 71) according to claim 1, wherein a switching valve (144) arranged in a bottom distribution plate (94) of the cylinder bottom (83) is connected upstream of the pressure chamber (142).

6. The workpiece-clamping element (70; 71) according to claim 1, wherein the lifting rod assembly (100) is mounted in the cylinder (81) by slide bearings (171, 172).

7. The workpiece-clamping element (70; 71) according to claim 1, wherein when the lifting rod assembly (100) is in an extended end position (73) of the workpiece-clamping element (70; 71), a pneumatic connection between the suction plate (111) and a suction connection (161) is released, and wherein the pneumatic connection is blocked by the lifting rod assembly (100) when the lifting rod assembly (100) is in a retracted end position (72) of the workpiece-clamping element (70; 71).

8. A workpiece table (30), comprising a plurality of the workpiece-clamping elements (70; 71) according to claim 1.

9. The workpiece table (30) according to claim 8, further comprising at least one carrier plate (55) with the plurality of workpiece-clamping elements (70; 71) fastened therein.

10. The workpiece table (30) according to claim 8, wherein each of the plurality of workpiece-clamping elements (70; 71) can be controlled individually.

\* \* \* \* \*